United States Patent Office 2,749,369
Patented June 5, 1956

2,749,369

FLUORINATED ETHER AND METHOD OF PRODUCTION

Ashton M. Lyon, Summit, and Julius G. Shukys, Chatham Township, Morris County, N. J., assignors to Air Reduction Company, Incorporated, New York, N. Y., a corporation of New York No Drawing. Application May 28, 1952,
Serial No. 290,583

5 Claims. (Cl. 260—614)

This invention relates to the novel compound, trifluoroisopropyl vinyl ether and to the method for producing the same. The compound can be represented by the following formula:

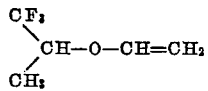

The compound exhibits anesthetic properties in laboratory animals and is capable of producing anesthesia in laboratory animals when administered in vapor form.

Trifluoroisopropyl vinyl ether may also be used for other purposes, as for example, in the preparation of polymeric materials.

In general, trifluoroisopropyl vinyl ether can be prepared by vinylation of trifluoroisopropyl alcohol with acetylene in the presence of the corresponding alkali metal alcoholate, for example, potassium trifluoroisopropylate. In a preferred embodiment of the process, an excess of trifluoroisopropyl alcohol is treated with an alkali metal, for example, potassium, in a suitable solvent, for instance, ethyl ether, and after the removal of the ether, the resulting reaction mixture, which contains both trifluoroisopropyl alcohol and potassium trifluoroisopropylate, is vinylated with acetylene.

The following example will serve to illustrate the preparation of trifluoroisopropyl vinyl ether.

Example

Trifluoroisopropanol (403 grams) was added slowly to a cooled suspension of potassium metal (17 grams) in ethyl ether (250 ml.) with agitation. When all the potassium had reacted, the resulting solution was fractionally distilled to remove the ethyl ether. The residue, comprising trifluoroisopropanol and potassium trifluoroisopropylate, was charged into a bomb and heated to 150° C. Acetylene was then introduced at 260 p. s. i. The gas pressure was maintained for 4.5 hours under mechanical agitation throughout the reaction. The bomb was then allowed to cool to room temperature and the reaction mixture fractionally distilled, whereupon crude trifluoroisopropyl vinyl ether boiling at 56.5–64° C. was obtained. More of the crude compound was obtained by reacting the residue remaining after distillation with acetylene in the same manner. The crude trifluoroisopropyl vinyl ether on redistillation gave purified trifluoroisopropyl vinyl ether having a B. P. of 61.5° C. at 749 mm. and a refractive index of 1.3353 at 20° C.

Potassium hydroxide can be employed instead of potassium metal to form the potassium trifluoroisopropylate. However, this introduces water in the reaction mixture which would require removal prior to the vinylation with acetylene.

We claim:

1. Trifluoroisopropyl vinyl ether having the formula,

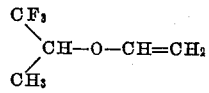

2. A process which comprises reacting trifluoroisopropyl alcohol with acetylene in the presence of an alkali metal trifluoroisopropylate so as to produce trifluoroisopropyl vinyl ether.

3. A process in accordance with claim 2 wherein the alkali metal is potassium.

4. A process in accordance with claim 2 wherein the alkali metal trifluoroisopropylate is formed by reacting an excess of trifluoroisopropyl alcohol with an alkali metal and the reaction mixture is vinylated with acetylene.

5. A process in accordance with claim 4 wherein the alkali metal is potassium.

References Cited in the file of this patent
UNITED STATES PATENTS

| 2,021,869 | Reppe et al. | Nov. 19, 1935 |
| 2,472,811 | Dickey | June 14, 1949 |
| 2,579,411 | Adelman | Dec. 18, 1951 |

FOREIGN PATENTS

| 621,654 | Great Britain | Apr. 13, 1949 |